United States Patent
Muramatsu et al.

(10) Patent No.: US 10,794,106 B2
(45) Date of Patent: Oct. 6, 2020

(54) WIRE TYPE WINDOW REGULATOR FOR VEHICLE

(71) Applicant: SHIROKI CORPORATION, Fujisawa-shi, Kanagawa (JP)

(72) Inventors: Atsushi Muramatsu, Fujisawa (JP); Toru Ikoma, Fujisawa (JP); Yoshiki Sugita, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 112 days.

(21) Appl. No.: 16/081,488

(22) PCT Filed: Mar. 21, 2017

(86) PCT No.: PCT/JP2017/011224
§ 371 (c)(1),
(2) Date: Aug. 31, 2018

(87) PCT Pub. No.: WO2017/203810
PCT Pub. Date: Nov. 30, 2017

(65) Prior Publication Data
US 2019/0063136 A1 Feb. 28, 2019

(30) Foreign Application Priority Data
May 24, 2016 (JP) .................................. 2016-103368

(51) Int. Cl.
*E05F 15/697* (2015.01)
*E05F 15/689* (2015.01)
(Continued)

(52) U.S. Cl.
CPC ............... *E05F 15/697* (2015.01); *B60J 1/17* (2013.01); *E05F 11/483* (2013.01);
(Continued)

(58) Field of Classification Search
None
See application file for complete search history.

(56) References Cited

U.S. PATENT DOCUMENTS

| | | | | |
|---|---|---|---|---|
| 4,648,206 A | * | 3/1987 | Moriya | ...................... B60J 1/17 49/352 |
| 5,333,411 A | * | 8/1994 | Tschirschwitz | ....... E05F 11/486 49/352 |

(Continued)

FOREIGN PATENT DOCUMENTS

| | | |
|---|---|---|
| JP | H02-039088 U | 3/1990 |
| JP | H06-045593 Y2 | 11/1994 |

(Continued)

OTHER PUBLICATIONS

International Search Report (PCT/ISA/210) dated May 23, 2017, by the Japanese Patent Office as the International Searching Authority for International Application No. PCT/JP2017/011224.

(Continued)

*Primary Examiner* — Marcus Menezes
(74) *Attorney, Agent, or Firm* — Buchanan Ingersoll & Rooney PC (57) ABSTRACT

A wire type window regulator for vehicle that allows easily guiding a drive wire to a wire insertion clearance of a wire guide member and/or a drum housing during assembly is obtained. A wire guide member includes a wire guide groove around which the drive wire is wound, a wire disconnection prevention portion, and an inclination guide surface. The wire disconnection prevention portion is disposed to extend from one region to another region of regions on both sides between which the wire guide groove is interposed. The wire disconnection prevention portion forms a wire insertion clearance from which the drive wire is introducible to the wire guide groove with the other region. The inclination guide surface is disposed in the other region. The inclination (Continued)

guide surface guides the drive wire introduced to the wire guide groove to the wire insertion clearance.

7 Claims, 7 Drawing Sheets

(51) Int. Cl.
    *B60J 1/17*     (2006.01)
    *E05F 11/48*     (2006.01)

(52) U.S. Cl.
    CPC ........... *E05F 15/689* (2015.01); *E05F 11/486* (2013.01); *E05Y 2201/654* (2013.01); *E05Y 2201/66* (2013.01); *E05Y 2201/668* (2013.01); *E05Y 2900/55* (2013.01)

(56) References Cited

U.S. PATENT DOCUMENTS

| | | | | |
|---|---|---|---|---|
| 5,606,827 | A * | 3/1997 | Kanou | E05F 15/697 49/352 |
| 6,408,572 | B1 * | 6/2002 | Uchimura | E05F 11/485 464/92 |
| 6,427,386 | B1 * | 8/2002 | Kalb | H02K 7/1166 49/349 |
| 2006/0130405 | A1 * | 6/2006 | Hemond | E05F 15/697 49/352 |
| 2019/0136599 | A1 * | 5/2019 | Kinoshita | E05F 11/488 |
| 2019/0195000 | A1 * | 6/2019 | Arimoto | E05F 15/689 |

FOREIGN PATENT DOCUMENTS

| | | |
|---|---|---|
| JP | H07-020305 Y2 | 5/1995 |
| JP | H08-210022 A | 8/1996 |
| JP | 2521628 Y2 | 10/1996 |

OTHER PUBLICATIONS

Written Opinion (PCT/ISA/237) dated May 23, 2017, by the Japanese Patent Office as the International Searching Authority for International Application No. PCT/JP2017/011224.

* cited by examiner

WIRE TYPE WINDOW REGULATOR FOR VEHICLE

TECHNICAL FIELD

The present invention relates to a wire type window regulator for vehicle and especially relates to a guide mechanism that guides a drive wire to a wire insertion clearance of a wire guide member and/or a drum housing during assembly.

BACKGROUND ART

A wire type window regulator for vehicle includes a guide rail extending in a longitudinal direction, a slider base which is supported to this guide rail to freely move up and down and to which a window glass is supported, a drive wire configured to drive to move up and down the slider base along the guide rail, and a driving mechanism that drives this drive wire. Upper and lower wire guide members are provided adjacent to the upper and the lower ends of the guide rail. These wire guide members include disconnection prevention portions that temporarily hold the drive wire to prevent the disconnection during the assembly. This disconnection prevention portion is formed as, for example, a disconnection prevention tab (collar portion), and a wire insertion clearance is formed between the disconnection prevention tab and a guide portion (a wire routing groove and a guide groove) (Patent Document 1).
Patent Document 1: JP-A-08-210022

DISCLOSURE OF THE INVENTION

Problems to be Solved by the Invention

However, the above-described conventional wire type window regulator for vehicle needs to move (introduce) the drive wire aiming to the wire insertion clearance of the disconnection prevention portion such that the drive wire is inserted from the wire insertion clearance into the guide portion. This has caused a problem that work of moving the drive wire to the wire insertion clearance itself is difficult. Additionally, this technical problem similarly occurs in the case where the drive wire is guided to the wire insertion clearance of a drum housing.

Therefore, an object of the present invention is to obtain a wire type window regulator for vehicle that allows easily guiding a drive wire to a wire insertion clearance of a wire guide member and/or a drum housing during assembly.

Solutions to the Problems

A wire type window regulator for vehicle of the present invention includes a guide rail, a slider base, a drive wire, a wire driving mechanism, and a wire guide member. The guide rail is fixed to a vehicle door panel. The slider base is supported to the guide rail to freely move up and down. A window glass is supported to the slider base. The drive wire is configured to drive to move up and down the slider base along the guide rail. The wire driving mechanism is configured to drive the drive wire. The wire guide member is disposed on at least one of an upper end and a lower end of the guide rail. The wire guide member is configured to change a routing direction of the drive wire. The wire guide member includes a wire guide groove, a wire disconnection prevention portion, and an inclination guide surface. The drive wire is wound around the wire guide groove. The wire disconnection prevention portion is disposed to extend from one region to another region of regions on both sides between which the wire guide groove is interposed. The wire disconnection prevention portion forms a wire insertion clearance from which the drive wire is introducible to the wire guide groove with the other region. The inclination guide surface is disposed in the other region. The inclination guide surface guides the drive wire to be introduced to the wire guide groove to the wire insertion clearance.

The following is preferable. The wire guide member includes a body portion having the wire guide groove and a fixation portion. The fixation portion is mounted to one end of the guide rail and fixed to the vehicle door panel. The inclination guide surface couples the fixation portion and the body portion together.

A wire type window regulator for vehicle of the present invention according to another aspect includes a guide rail, a slider base, a drive wire, a wire driving mechanism, a drive drum, and a drum housing. The guide rail is fixed to a vehicle door panel. The slider base is supported to the guide rail to freely move up and down. A window glass is supported to the slider base. The drive wire is configured to drive to move up and down the slider base along the guide rail. The wire driving mechanism is configured to drive the drive wire. The drive drum has a wire guide groove around which the drive wire is wound on an outer peripheral surface. The drum housing rotatably houses and supports the drive drum. The drum housing includes a wire routing guide groove of the drive drum, a wire disconnection prevention portion, and an inclination guide surface. The wire routing guide groove extends in a tangential direction of the wire guide groove. The wire disconnection prevention portion is disposed to extend from one region to another region of regions on both sides between which the wire routing guide groove is interposed. The wire disconnection prevention portion forms a wire insertion clearance from which the drive wire is introducible to the wire routing guide groove with the other region. The inclination guide surface is disposed in the other region. The inclination guide surface guides the drive wire to be introduced to the wire routing guide groove to the wire insertion clearance.

Effects of the Invention

The present invention allows obtaining a wire type window regulator for vehicle configured to easily guide a drive wire to a wire insertion clearance of a wire guide member and/or a drum housing during assembly.

DESCRIPTION OF PREFERRED EMBODIMENTS

Figure 1:
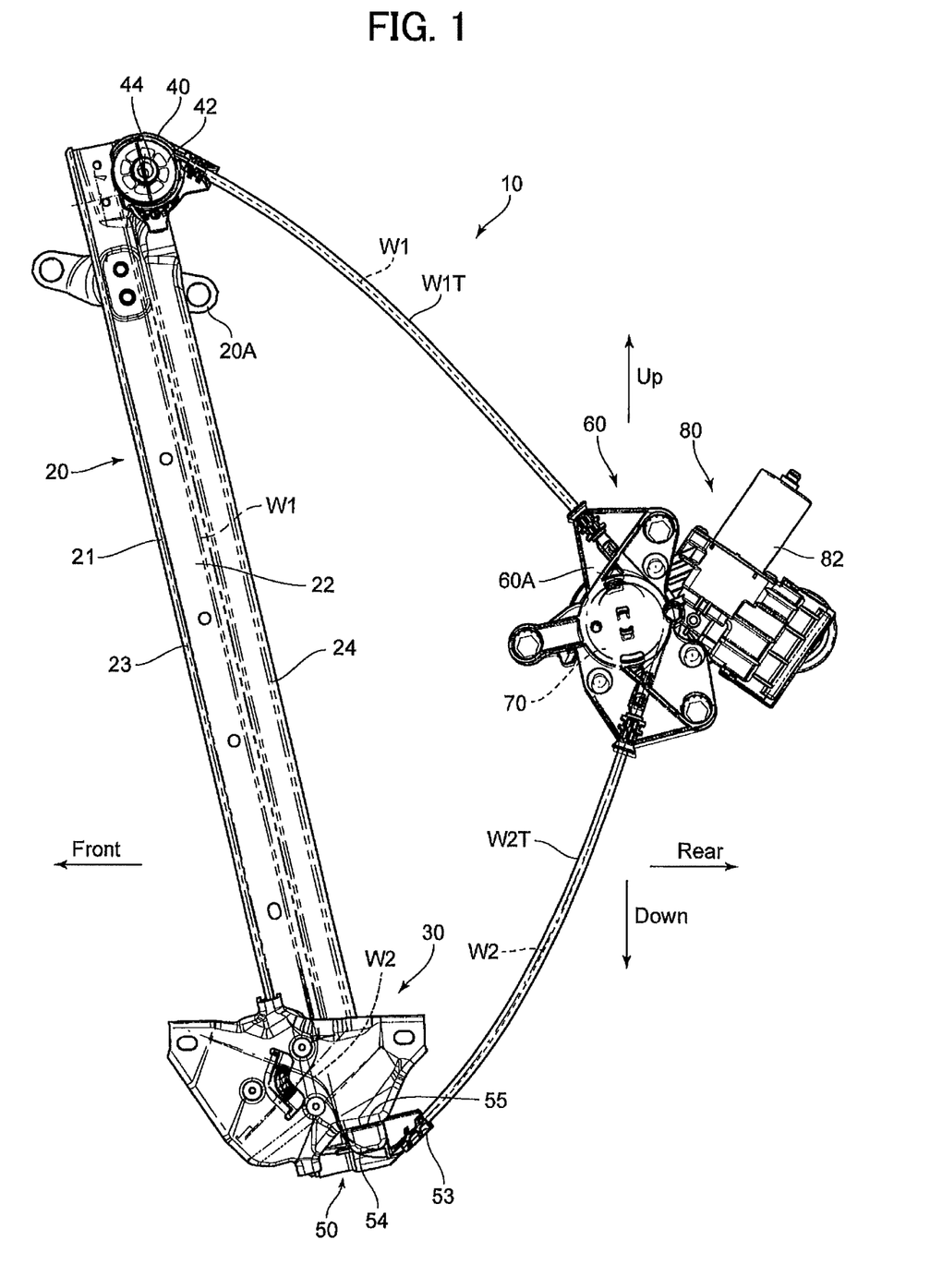
FIG. 1 is a front view (a drawing viewed from a vehicle outer side) of a wire type window regulator for vehicle according to this embodiment.

The following describes an embodiment of a wire type window regulator for vehicle 10 of the present invention. As illustrated in FIG. 1, the wire type window regulator for vehicle 10 includes a guide rail 20 as an elongated member. The guide rail 20 is mounted to an inside of a vehicle door panel (not illustrated) via brackets 20A (only one of them is illustrated) disposed on different positions in a longitudinal direction. The guide rail 20 is arranged having the longitudinal direction in an almost height direction of the vehicle in a state of being mounted to the vehicle door panel.

The wire type window regulator for vehicle 10 includes a slider base (glass carrier) 30 that is supported to the guide rail 20 so as to freely move up and down and to which a window glass (not illustrated) is supported. Wire ends W1E and W2E, which are one ends of a pair of drive wires W1 and W2, respectively, are coupled to this slider base 30.

A pulley bracket (upper guide member) 40, which is a wire guide member to change the routing direction of the drive wire W1, is fixed adjacent to an upper end in the longitudinal direction of the guide rail 20, and a guide pulley 42 is rotatably supported to this pulley bracket 40 via a pulley support shaft 44. The drive wire W1 extends from the slider base 30 in an upward direction of the guide rail 20 along the guide rail 20, and is supported by a wire guide groove formed on an outer peripheral surface of the guide pulley 42. Corresponding to advance and retreat of the drive wire W1, the guide pulley 42 rotates around the pulley support shaft 44.

A wire guide member (lower guide member) 50, which is a wire guide member to change the routing direction of the drive wire W2, is disposed adjacent to a lower end in the longitudinal direction of the guide rail 20. The drive wire W2 extends from the slider base 30 in a downward direction of the guide rail 20 along the guide rail 20, and is guided by the wire guide member 50. The wire guide member 50 is fixed to the guide rail 20, and the drive wire W2 is supported such that the drive wire W2 is configured to advance and retreat along a wire guide groove 54 formed on the wire guide member 50.

The drive wire W1 coming out from the guide pulley 42 is inserted through a tubular outer tube W1T and wound around a drive drum 70 disposed inside a drum housing 60 to which the outer tube W1T is coupled. The drive wire W2 coming out from the wire guide member 50 is inserted through a tubular outer tube W2T and wound around the drive drum 70 disposed inside the drum housing 60 to which the outer tube W2T is coupled.

A motor unit 80 is mounted to the drum housing 60. The motor unit 80 includes a driving motor, which rotates the drive drum 70, and a gear box (not illustrated).

The outer tube W1T has one end coupled to the pulley bracket 40 and the other end coupled to the drum housing 60, and the drive wire W1 is configured to advance and retreat in the outer tube W1T having thus determined both end positions. The outer tube W2T has one end coupled to the wire guide member 50 and the other end coupled to the drum housing 60, and the drive wire W2 is configured to advance and retreat in the outer tube W2T having thus determined both end positions.

The drum housing 60 is fixed to the vehicle door panel (not illustrated). When the driving force of the motor in the motor unit 80 positively/reversely rotates the drive drum 70, one of the drive wire W1 and the drive wire W2 increases a winding amount around the drive drum 70, and the other is drawn out from the drive drum 70, thus causing the slider base 30 to move along the guide rail 20 due to a relationship of pulling and loosening between the drive wire W1 and the drive wire W2. Corresponding to the move of the slider base 30, the window glass (not illustrated) moves up and down.

Figure 2:
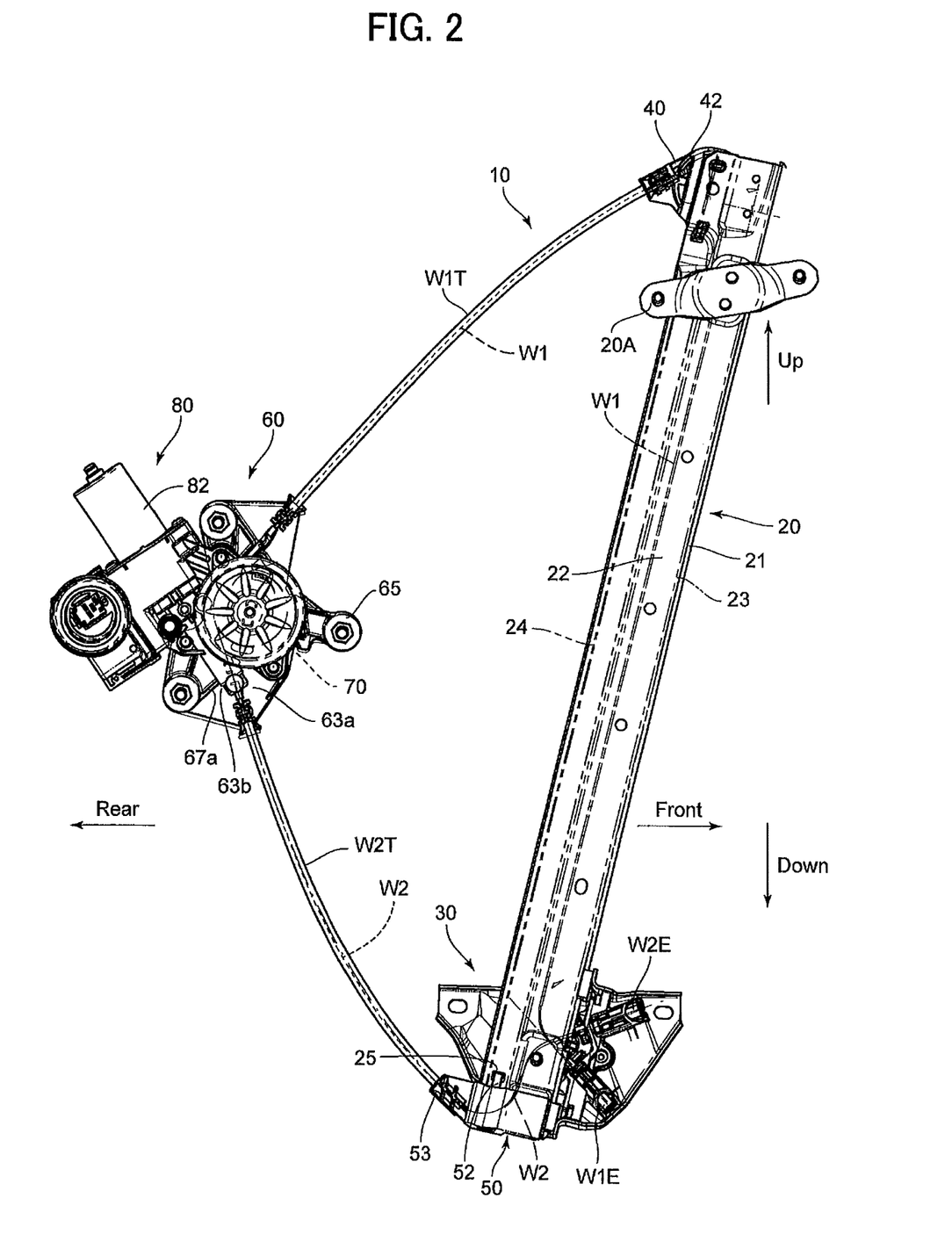
FIG. 2 is a back view (a drawing viewed from a vehicle inner side) of the wire type window regulator for vehicle according to this embodiment.

With the wire type window regulator for vehicle 10 having the above-described basic configuration, the pulley bracket 40 is fixed to the upper end of the guide rail 20 and the wire guide member 50 is fixed to the lower end of the guide rail 20. As illustrated in FIG. 1 and FIG. 2, the guide rail 20 has a hat shape in the cross-sectional surface and includes vehicle front-rear direction rail portions 21 and 22 on a vehicle inner side and a vehicle outer side, a front-rear position restricting rail portion 23 that couples these vehicle front-rear direction rail portions 21 and 22, and a hook-shaped rail portion 24 that extends from an end on a side opposite to the front-rear position restricting rail portion 23 of the vehicle front-rear direction rail portion 22 to the vehicle outer side. The vehicle front-rear direction rail portion 21 constitutes a vehicle-width direction position restricting rail portion. An engaging hole 25 (FIG. 2) to fix the wire guide member 50 is drilled on the vehicle front-rear direction rail portion 22.

Figure 3:
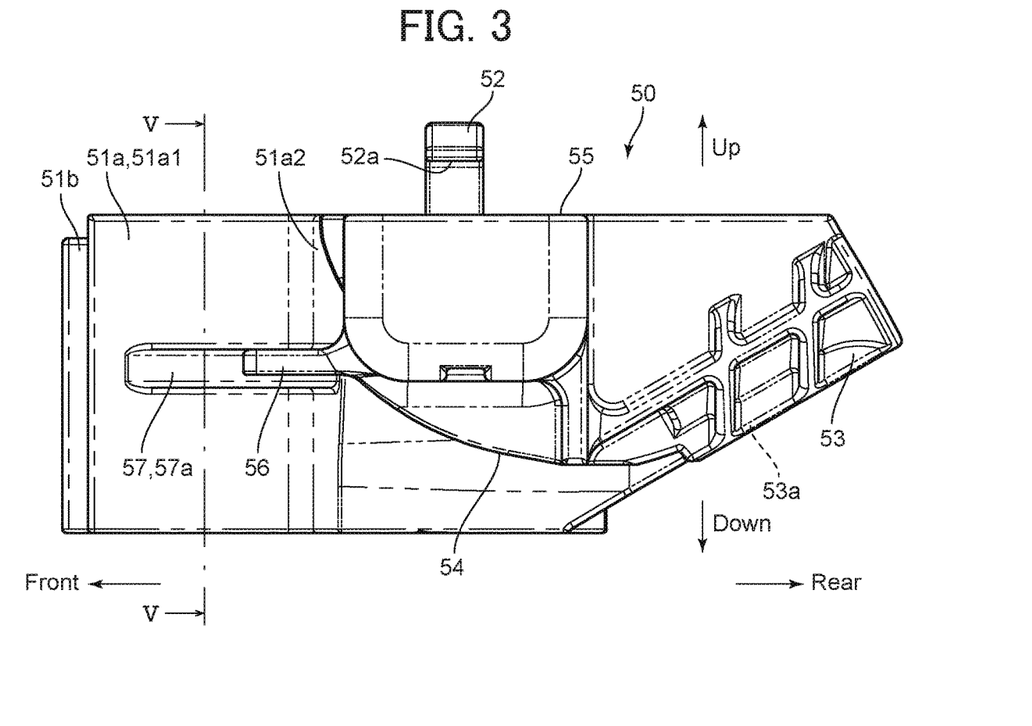
FIG. 3 is a front view of a lower guide member alone.
Figure 4:
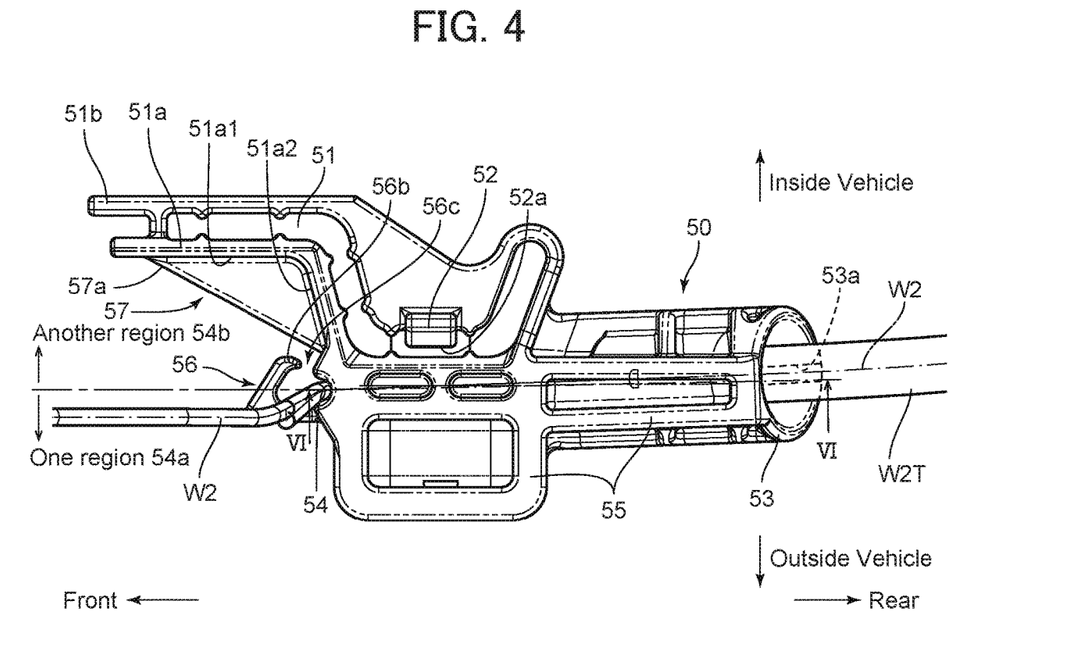
FIG. 4 is a plan view of the lower guide member.
Figure 5:
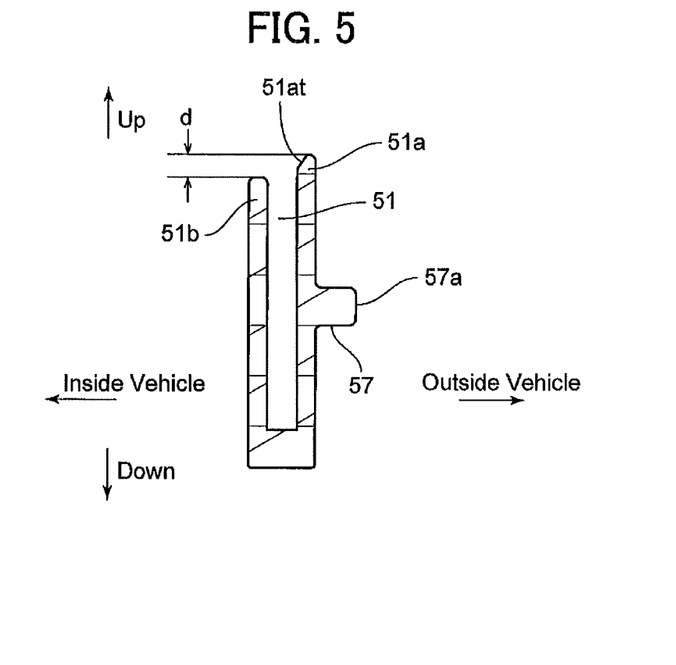
FIG. 5 is a cross-sectional view taken along the line V-V of FIG. 3.
Figure 6:
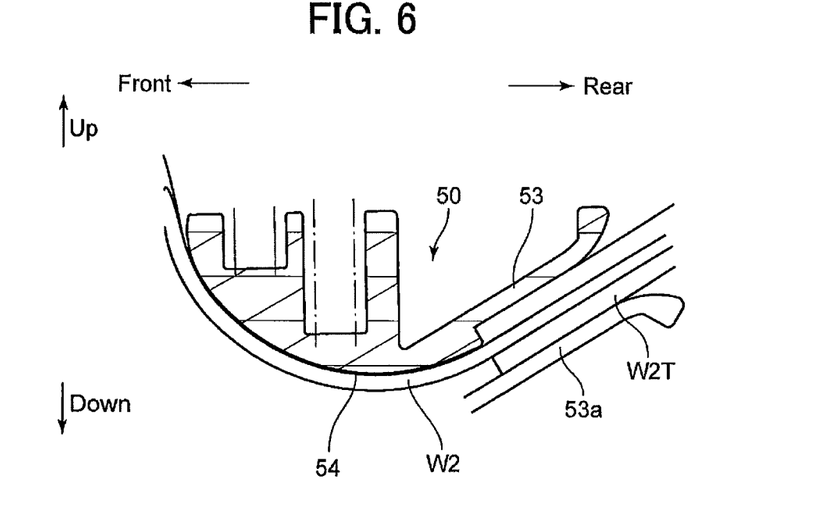
FIG. 6 is a cross-sectional view taken along the line VI-VI of FIG. 4.

The following describes the wire guide member 50 with reference to FIG. 3 to FIG. 7. The wire guide member 50 is formed of a molded product made of a synthetic resin material and includes a rail insertion groove 51, an elastic locking foot 52, a tubular tube insertion portion 53, the wire guide groove 54, a restricting surface (portion) 55, a disconnection prevention tab 56, and an inclined rib 57. The guide rail 20 is inserted into the rail insertion groove 51. The elastic locking foot 52 includes a hook portion 52a engaged with the engaging hole 25 of the guide rail 20. The distal end of the outer tube W2T is inserted into the tubular tube insertion portion 53. The wire guide groove 54 extends on a plane identical to a surface including the axis line of the tubular tube insertion portion 53 (outer tube W2T) in an arc shape in front view. The restricting surface 55 restricts an end of descent of the slider base 30. The disconnection prevention tab 56 prevents the drive wire W2 from being disconnected from the wire guide groove 54 before and after the drive wire W2 is fitted to (engaged with) the wire guide groove 54. The inclined rib 57 has an inclination guide surface (wire guide surface) 57a to guide the drive wire W2 to the disconnection prevention tab 56. The tubular tube insertion portion 53 includes a slit 53a to introduce the drive wire W2 to the wire guide groove 54 in the lower portion in the radial direction (FIG. 3, FIG. 4, and FIG. 6). The rail insertion groove 51 is formed of a paired vertical walls 51a and 51b (FIG. 3, FIG. 4, FIG. 5, and FIG. 7) with blocked bottom portion (FIG. 5). As apparent from FIG. 5 and FIG. 7, in the vertical walls 51a and 51b, the one (vertical wall 51a) is longer (projects upward) than the other (vertical wall 51b), and a level difference d1 (FIG. 5) is present between both. A tapered surface 51at obliquely inclined downward to the vertical wall 51b side is formed on the upper end of the vertical wall 51a. Thus, a height difference is provided between the vertical walls 51a and 51b constituting the rail insertion groove 51, and further the tapered surface 51 at is disposed on the upper end of the higher vertical wall 51a. This ensures easily inserting the guide rail 20 into the rail insertion groove 51. The rail insertion groove 51 and the vertical walls 51a and 51b form a fixation portion (a fixation portion mounted to the one end of the guide rail 20 and fixed to the vehicle door panel) that fixes the wire guide member 50 to the guide rail 20, and the other part forms a body portion having the wire guide groove 54 of the wire guide member 50.

Figure 7:
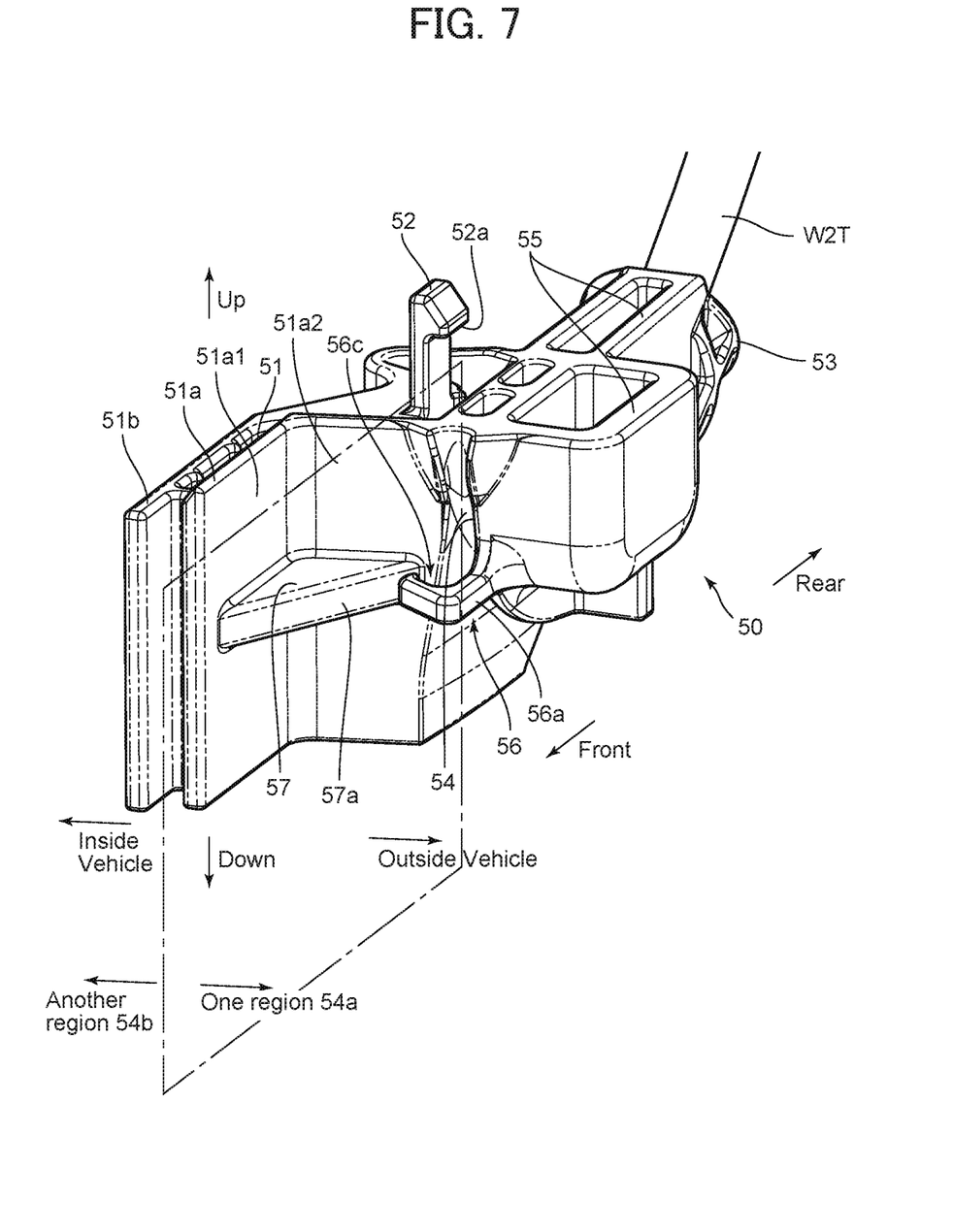
FIG. 7 is a perspective view of the lower guide member alone.

The wire guide member 50 includes the wire disconnection prevention tab (wire disconnection prevention portion) 56. The wire disconnection prevention tab 56 is disposed so as to extend from a one region 54a among the one region 54a and another region 54b, which are formed by a division into two by a plane passing through the center (center line) of the wire guide groove 54, toward the other region 54b and forms a wire insertion clearance 56c with the wire guide groove 54.

The disconnection prevention tab 56 has a hook shape including a base portion 56a and a disconnection prevention hook 56b. The base portion 56a extends in a direction perpendicular to a plane including the center line of the wire guide groove 54. The disconnection prevention hook 56b forms an acute angle with the distal end of the base portion 56a and extends toward the inclined rib 57. The wire insertion clearance 56c is formed between the distal end of the disconnection prevention hook 56b and the inclined rib 57. The disconnection prevention hook 56b extends intersecting with the plane including the center line of the wire guide groove 54.

An inclination guide surface 57a of the inclined rib 57 is an inclined surface that reduces a distance with the disconnection prevention hook 56b as approaching the disconnection prevention tab 56. In the illustrated working example, the inclination guide surface 57a is continuous with the wire guide groove 54 (the other region 54b part). The inclined rib 57 also serves as a reinforcing rib that couples two wall surfaces 51a1 and 51a2 (on the inferior angle side) (fixation portions) bent into an L shape of the vertical wall 51a forming the rail insertion groove 51 to the body portion having the wire guide groove 54 together for reinforcement.

The wire guide member 50 of the wire type window regulator for vehicle 10 with the above-described configuration includes the disconnection prevention tab (wire disconnection prevention portion) 56 and the inclination guide surface 57a. The disconnection prevention tab 56 is disposed so as to extend from the one region 54a among the regions 54a and 54b on both sides between which the wire guide groove 54 is interposed toward the other region 54b and forms the wire insertion clearance 56c, which allows the drive wire W2 to be introduced into the wire guide groove 54, with this other region 54b. The inclination guide surface 57a is disposed on the other region 54b to guide the drive wire W2 introduced into the wire guide groove 54 to the wire insertion clearance 56c. To engage the drive wire W2 with the wire guide groove 54 of the wire guide member 50, a worker presses the drive wire W2 against the inclination guide surface 57a of the inclined rib 57 at any position separated from the wire insertion clearance 56c to move the drive wire W2 to the wire insertion clearance 56c (the disconnection prevention tab 56, the wire guide groove 54) side while pressing the drive wire W2. Then, the drive wire W2 moves while the drive wire W2 is in slidable contact with the inclination guide surface 57a, soon reaches the wire insertion clearance 56c, and is guided (introduced) from this wire insertion clearance 56c to the inside (wire guide groove 54) of the disconnection prevention hook 56b.

Once the drive wire W2 enters in the disconnection prevention hook 56b, the drive wire W2 is held to the inside of the disconnection prevention hook 56b by a restoring force of attempting to restore the shape to the straight line shape of itself and does not easily drop. In the wire guide member 50, the tubular tube insertion portion 53 faces the tangential direction of the wire guide groove 54 and the radius of the wire guide groove 54 is configured to be large; therefore, the drive wire W2 is smoothly guided to the wire guide groove 54 and improves the durability of the drive wire W2.

The wire guide groove 54 has a bugle shape that radially expands from the disconnection prevention tab 56 to the upper side (toward the restricting surface 55) (FIG. 7). A rounding (chamfering) process is performed on a boundary part between the wire guide groove 54 and the restricting surface 55. Thus, since the wire guide groove 54 is radially expanded, even when the drive wire W2 swings in the vehicle inner-outer direction when the slider base 30 is moved up and down, the drive wire W2 does not hit against the corner of the wire guide groove 54 and therefore the drive wire W2 is less likely to be damaged.

Figure 8:
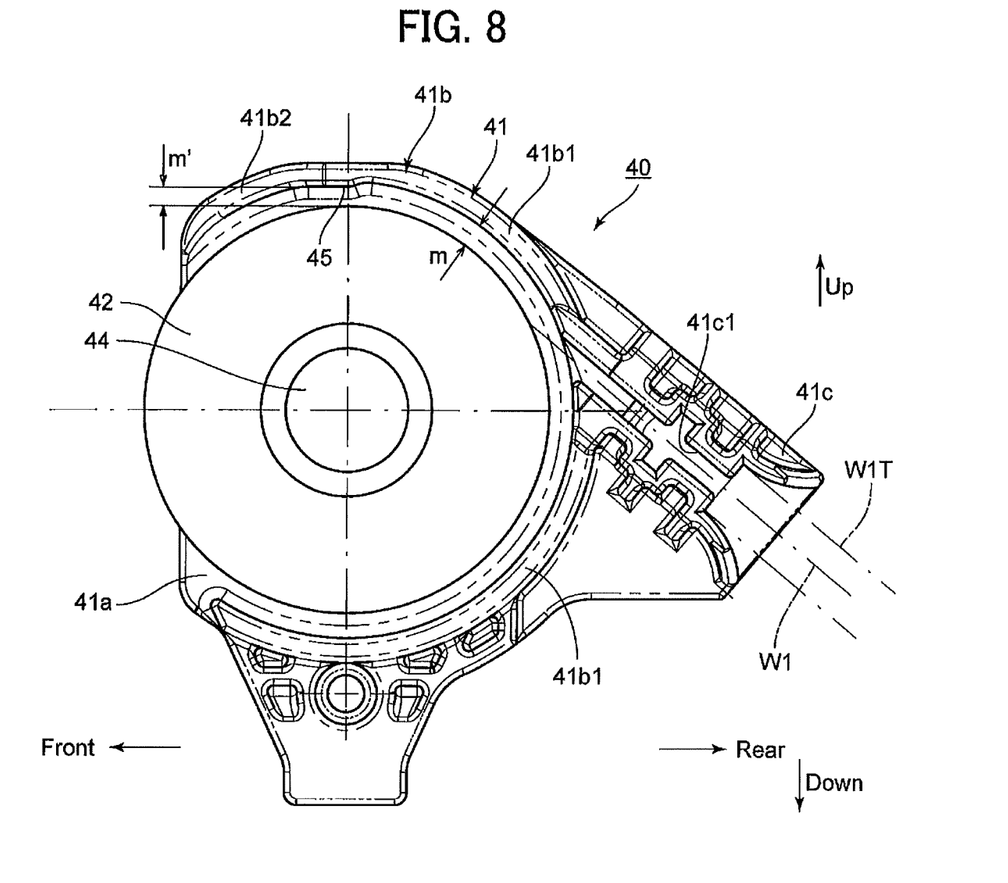
FIG. 8 is a front view of an upper guide member.
Figure 9:
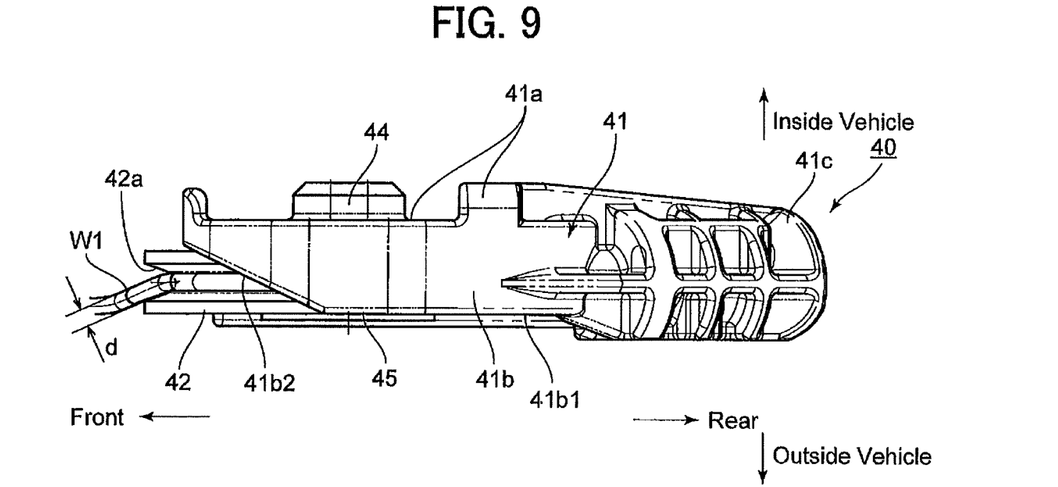
FIG. 9 is a plan view of the upper guide member.

FIG. 8 and FIG. 9 are embodiments of the application of the present invention to the pulley bracket (wire guide member) 40 combined with the upper end of the guide rail 20. As described above, the pulley bracket 40 includes the guide pulley 42 turnably supported at the pulley support shaft 44. A wire guide groove 42a around which the drive wire W1 is wound is formed on the outer peripheral surface of the guide pulley 42. The pulley support shaft 44 is supported to a cover member 41 fixed to the upper end of the guide rail 20. The cover member 41 includes a base plate 41a, an outer peripheral flange portion 41b, and a tubular tube insertion portion 41c. The base plate 41a is perpendicular to the axis line of the pulley support shaft 44 and is positioned at one side in the axial direction of the guide pulley 42. The outer peripheral flange portion 41b is perpendicular to the base plate 41a and is positioned at the outer peripheral edge of the guide pulley 42. The tubular tube insertion portion 41c faces the tangential direction of the outer periphery of the guide pulley 42. An end surface 41b1 of the outer peripheral flange portion 41b perpendicular to the pulley support shaft 44 has an almost flat surface with the end surface of the guide pulley 42 (FIG. 9). The upper end of the outer tube W1T of the drive wire W1 is inserted into and fixed by the tubular tube insertion portion 41c, and the tubular tube insertion portion 41c includes a slit 41c1 into which the drive wire W1 exposed from the outer tube W1T is inserted.

As illustrated in FIG. 8, the outer peripheral flange portion 41b is positioned along the outer periphery of the guide pulley 42 except for a part of the outer peripheral flange portion 41b on the guide rail 20 side. When viewing the guide pulley 42 from the axial direction, a clearance m is present between the inner peripheral surface of the outer peripheral flange portion 41b and the outer peripheral surface of the pulley support shaft 44. This clearance m is a width larger than a diameter d of the drive wire W1 (m>d) and into which the drive wire W1 can be inserted from the direction perpendicular to the axis line of the guide pulley 42.

Meanwhile, a narrow portion (disconnection prevention portion) 45 is formed at a part of the upper end of the outer peripheral flange portion 41b. The narrow portion 45 reduces a distance with the outer periphery of the guide pulley 42 when the guide pulley 42 is viewed from the axial direction so as to meet the clearance (wire insertion clearance) m' (m>m'). The clearance m' is equivalent to or smaller than the diameter d of the drive wire W1 (m'≤d) so as to generate a resistance when the drive wire W1 is inserted from the axial direction of the pulley support shaft 44 to the wire guide groove 42a of the guide pulley 42 through the narrow portion 45. That is, when the drive wire W1 is inserted from the narrow portion 45 to the outer periphery of the guide pulley 42 and is fitted to the wire guide groove 42a, the drive wire W1 is less likely to be disconnected from the guide pulley 42 (pulley bracket 40) (does not easily come out to the outside of the cover member 41 through the clearance of the narrow portion 45).

As illustrated in FIG. 9, an inclination guide surface 41b2 is formed on the outer peripheral flange portion 41b of the cover member 41. When the cover member 41 is viewed from the direction perpendicular to the axis line of the guide pulley 42, the inclination guide surface 41b2 exposes the wire guide groove 42a of the guide pulley 42, and at the same time, reduces a distance with the narrow portion 45 in the circumferential direction and the radial direction as the inclination guide surface 41b2 approaches the end surface 41b1 of the outer peripheral flange portion 41b from the base plate 41a.

With this wire type window regulator for vehicle 10 with the above-described configuration, when the drive wire W1 is engaged with the guide pulley 42 of the pulley bracket 40, while pressing the drive wire W1 against the inclination guide surface 41b2 of the cover member 41, the worker moves (slides) the drive wire W1 to the narrow portion (wire insertion clearance) 45 side. Then, since the drive wire W1 is pressed against the inclination guide surface 41b2, the drive wire W1 surely approaches the narrow portion 45 while slidably moving on the inclination guide surface 41b2. In the approaching state, the drive wire W1 can be inserted from the clearance (wire insertion clearance) between the narrow portion 45 of the outer peripheral flange portion 41b and the guide pulley 42 into between the wire guide groove 42a and the outer peripheral flange portion 41b. Once the drive wire W1 enters in the wire guide groove 42a, the drive wire W1 is held to the inside of the outer peripheral flange portion 41b by a restoring force of attempting to restore the shape to the straight line shape of itself and does not easily drop.

The above-described embodiment configures the pulley bracket 40 as the upper guide member and the wire guide member 50 as the lower guide member. However, the present invention may configure the pulley bracket 40 as the lower guide member and the wire guide member 50 as the upper guide member, and both guide members of the upper and the lower guide members may be configured as the pulley brackets 40 or the wire guide members 50.

Figure 10:
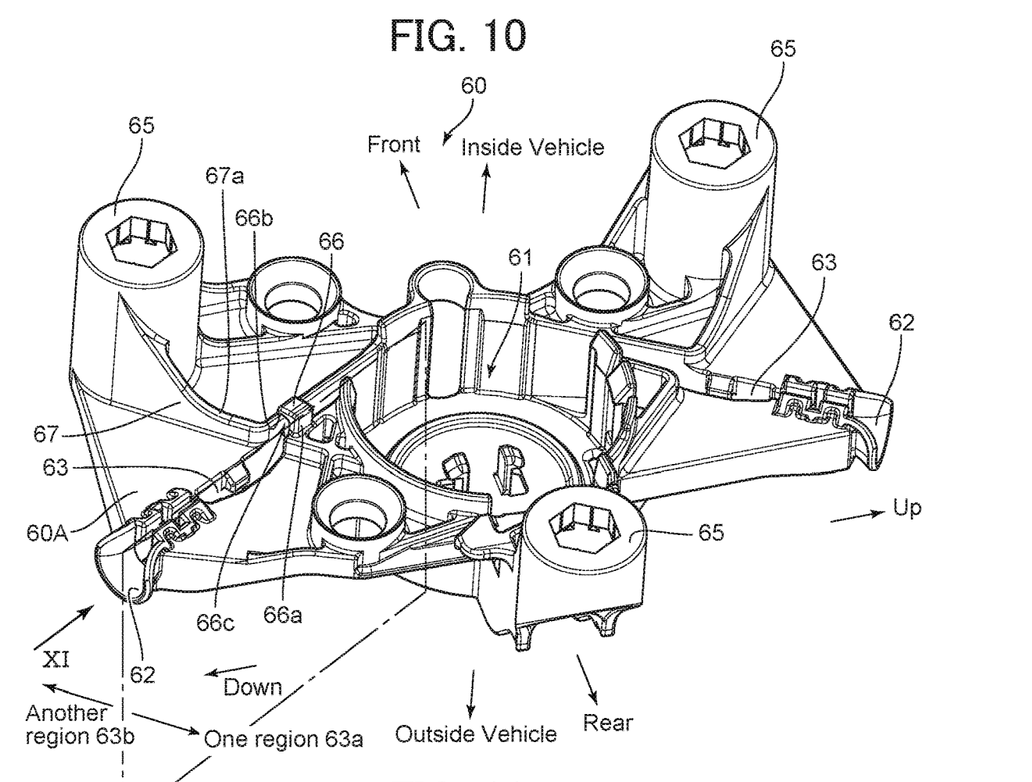
FIG. 10 is a perspective view of a drum housing alone of the wire type window regulator for vehicle.
Figure 11:
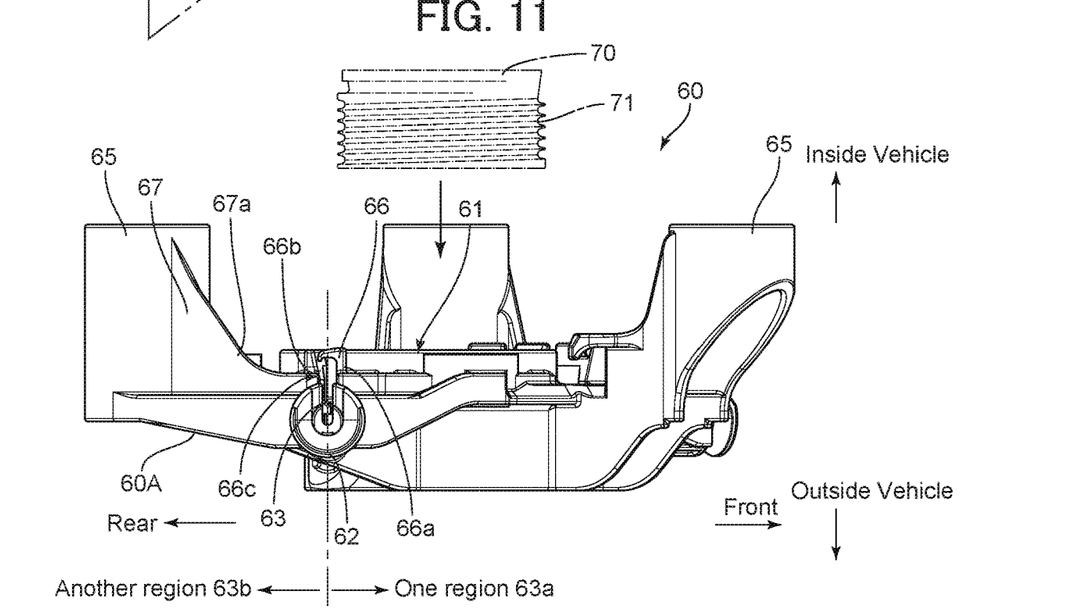
FIG. 11 is a side view of the drum housing alone viewed from the arrow XI direction of FIG. 10.

The above-described embodiment is an example of the application of the present invention to the upper guide member (pulley bracket 40) and the lower guide member (wire guide member 50) of the wire type window regulator for vehicle 10. The present invention is also applicable to the drum housing 60. FIG. 10 and FIG. 11 illustrate an embodiment that applies the present invention to the drum housing (driving mechanism) 60 and illustrate the drum housing 60 alone.

The drum housing 60 includes the drive drum 70 around which a pair of drive wires are wound. The drive drum 70 has a columnar shape and has a spiral groove 71 around which the drive wire W1 and the drive wire W2 are wound on the outer peripheral surface (FIG. 11). While rotating along the outer peripheral surface of the drive drum 70, this spiral groove 71 changes the position in the axis line direction of the drive drum 70. The drive drum 70 is turnably housed in a drum housing portion 61 of the drum housing 60.

The motor unit 80 is mounted to the drum housing 60. The motor unit 80 includes a motor 82 that includes a deceleration mechanism to positively/reversely rotate and drive the drive drum 70.

The outer tube W1T has one end coupled to the pulley bracket 40 and the other end coupled to the drum housing 60, and the drive wire W1 is configured to advance and retreat in the outer tube W1T having thus determined both end positions. The outer tube W2T has one end coupled to the wire guide member 50 and the other end coupled to the drum housing 60, and the drive wire W2 is configured to advance and retreat in the outer tube W2T having thus determined both end positions.

The drum housing 60 is fixed to the vehicle door panel (not illustrated) of the vehicle. When the driving force of the motor 82 positively/reversely rotates the drive drum 70, one of the drive wire W1 and the drive wire W2 increases a winding amount around the spiral groove 71 of the drive drum 70, and the other is drawn out from the spiral groove 71 of the drive drum 70, thus causing the slider base 30 to move along the guide rail 20 due to a relationship of pulling and loosening between the drive wire W1 and the drive wire W2. Corresponding to the move of the slider base 30, the window glass (not illustrated) moves up and down.

As illustrated in FIG. 10, the drum housing 60 includes the drum housing portion 61 and a pair of outer tube insertion portions 62. The drum housing portion 61 has a tubular shape with bottom whose one end is open. The drum housing 60 includes a pair of wire routing guide grooves 63, which are communicated with the drum housing portion 61, in mutually different directions (directions of the pulley bracket 40 and the wire guide member 50 in a completed state of the wire type window regulator for vehicle 10), and the pair of outer tube insertion portions 62 are formed on distal ends of the pair of wire routing guide grooves 63. The wire routing guide grooves 63 extend in a tangential direction of the spiral groove 71 of the drive drum 70 housed in the drum housing portion 61.

The drum housing 60 is formed of a molded product made of a synthetic resin material and includes the drum housing portion 61, the pair of outer tube insertion portions 62, and the wire routing guide grooves 63 on a base 60A. Three pieces of bosses 65 for fixing the vehicle door panel are formed at approximately regular distances and regular intervals from the center of the drum housing portion 61. Further, the drum housing 60 includes a disconnection prevention tab 66 and an inclined rib 67 having an inclination guide surface (wire guide surface) 67a on the base 60A. The disconnection prevention tab 66 prevents the drive wire W1 wound around the spiral groove 71 of the drive drum 70 from being disconnected from the wire routing guide grooves 63. The inclination guide surface 67a guides the drive wire W1 to the disconnection prevention tab 66.

The disconnection prevention tab 66 is disposed so as to extend from a one region 63a among the one region 63a and another region 63b, which are formed by a division into two by a plane passing through the center (center line) of the wire routing guide groove 63, toward the other region 63b. The disconnection prevention tab 66 has a hook shape including a base portion 66a and a disconnection prevention hook 66b. The base portion 66a extends from the one region 63a in a direction perpendicular to the above-described plane. The disconnection prevention hook 66b forms an acute angle with the distal end of the base portion 66a and extends toward the inclined rib 67. A wire insertion clearance 66c is formed between the distal end of the disconnection prevention hook 66b and the inclined rib 67. The disconnection prevention hook 66b extends intersecting with the plane passing through the center of the wire routing guide groove 63.

The inclined rib 67 is disposed in the other region 63b, inclined from the bosses 65 to the disconnection prevention tab 66 (disconnection prevention member), and includes the inclination guide surface 67a, which forms the wire insertion clearance 66c between the disconnection prevention tab 66 and the wire routing guide groove 63. The inclined rib 67 also serves as a reinforcing rib that couples the bosses 65 (fixation portions) and the base 60A (the other region 63b, the wire routing guide groove 63) (body portion) together for reinforcement.

With this wire type window regulator for vehicle 10 with the above-described configuration, to fit the drive wire W1 to the wire routing guide groove 63 after the drive drum 70 with the spiral groove 71 around which the drive wires W1 and W2 are wound is fitted to the drive drum housing portion 61, the worker presses the drive wire W1 against the inclination guide surface 67a at a position separated from the wire routing guide groove 63 (the disconnection prevention tab 66, the wire insertion clearance 66c) and moves the drive wire W1 in the pressed state to the wire insertion clearance 66c side. Then, since the drive wire W1 is pressed against the inclination guide surface 67a, the drive wire W1 surely approaches the wire insertion clearance 66c while slidably moving on the inclination guide surface 67a and can be easily introduced from the wire insertion clearance 66c to the inside of the wire routing guide groove 63. Once the drive wire W1 is introduced in the wire routing guide groove 63, the drive wire W1 is held to the inside of the wire routing guide groove 63 or the disconnection prevention hook 66b by a restoring force of attempting to restore the shape to the straight line shape of itself and does not easily drop. Afterwards, the end of the outer tube W1T is inserted into and engaged with the outer tube insertion portion 62.

The other drive wire W2 and outer tube W2T are mounted after the one drive wire W1 and outer tube W1T are mounted as described above. Since the one drive wire W1 is held to the disconnection prevention hook 56b and is less likely to be disconnected from the wire routing guide groove 63, the other drive wire W2 and outer tube W2T can be easily mounted comparatively. With the drive wires W1 and W2 and the outer tubes WIT and W2T mounted to the drum housing 60, the motor unit 80 is fixed to the drum housing 60 with a screw.

The drum housing 60 of the wire type window regulator for vehicle 10 includes the wire disconnection prevention tab (wire disconnection prevention portion) 66 and the inclination guide surface 67a. The wire disconnection prevention tab 66 is disposed so as to extend from the one region 63a among the regions 63a and 63b on both sides between which the wire routing guide groove 63 is interposed toward the other region 63b and forms the wire insertion clearance 66c, which allows the drive wire W1 to be introduced into the wire routing guide groove 63, with this other region 63b. The inclination guide surface 67a is disposed in the other region 63b to guide the drive wire W1 introduced into the wire routing guide groove 63 to the wire insertion clearance 66c. Only pressing the drive wire W1 against the inclination guide surface 67a at a position separated from the wire insertion clearance 66c and sliding the drive wire W1 to the wire insertion clearance 66c side allow the drive wire W1 to be guided to the wire insertion clearance 66c and to be easily introduced from the wire insertion clearance 66c to the wire routing guide groove 63. While this drum housing 60 has the disconnection prevention tab 66 and the inclination guide surface 67a in one of the pair of wire routing guide grooves 63, the disconnection prevention tab 66 and the inclination guide surface 67a may be disposed on both of the pair of wire routing guide grooves 63.

With the present invention, the inclination guide surface may have a plane or a curved surface from the position separated from the wire guide groove and the wire routing groove to the position coupled to the wire guide groove and the wire routing groove. The inclination guide surface only needs to form the wire insertion clearance with the wire disconnection prevention portion and guide the drive wire from the separated position to the wire insertion clearance.

INDUSTRIAL APPLICABILITY

The wire type window regulator for vehicle of the present invention is preferably applied to, for example, a wire type window regulator for vehicle configured to move a window glass of a vehicle up and down.

DESCRIPTION OF REFERENCE SIGNS 10 wire type window regulator for vehicle
20 guide rail
21, 22 vehicle front-rear direction rail portion
20A bracket
30 slider base (glass carrier)
40 pulley bracket (wire guide member, upper guide member)
41 cover member
41a base plate
41b outer peripheral flange portion
41b1 end surface
41b2 inclination guide surface
41c tubular tube insertion portion
42 guide pulley
42a wire guide groove
44 pulley support shaft
45 narrow portion
50 wire guide member (lower guide member)
51 rail insertion groove (fixation portion)
51a, 51b vertical wall (fixation portion)
51a1, 51a2 wall surface
51at tapered surface
52 elastic locking foot
53 tubular tube insertion portion
53a slit
54 wire guide groove
54a one region
54b other region
55 restricting surface (portion)
56 disconnection prevention tab
56a base portion
56b disconnection prevention hook
56c wire insertion clearance
57 inclined rib
57a inclination guide surface
60 drum housing
60A base
61 drum housing portion
62 outer tube insertion portion
63 wire routing guide groove
63a one region
63b other region
66 disconnection prevention tab
66a base portion
66b disconnection prevention hook 66c wire insertion clearance
67 inclined rib
67a inclination guide surface
70 drive drum
71 spiral groove
80 motor unit (driving mechanism)
W1, W2 drive wire
W1T, W2T outer tube

The invention claimed is:

1. A wire type window regulator for vehicle comprising:
a guide rail fixed to a vehicle door panel;
a slider base supported to the guide rail to freely move up and down, a window glass being supported to the slider base;
a drive wire configured to drive to move up and down the slider base along the guide rail;
a wire driving mechanism configured to drive the drive wire; and
a wire guide member disposed on at least one of an upper end and a lower end of the guide rail, the wire guide member being configured to change a routing direction of the drive wire, wherein
the wire guide member includes:
a wire guide groove around which the drive wire is wound;
a wire disconnection prevention portion disposed to extend from one region to another region of regions on both sides between which the wire guide groove is interposed, the wire disconnection prevention portion forming a wire insertion clearance from which the drive wire is introducible to the wire guide groove from the other region; and
an inclination guide surface disposed in the other region, the inclination guide surface guiding the drive wire to be introduced to the wire guide groove via the wire insertion clearance,
wherein the wire guide member further includes an inclined rib which extends in a direction crossing an extending direction of the wire guide groove, and an edge of the inclined rib forms the inclination guide surface.

2. The wire type window regulator for vehicle according to claim 1, wherein:
the wire guide member includes a body portion having the wire guide groove and a fixation portion, the fixation portion being mounted to one end of the guide rail and being positioned on an extension line of the inclination guide surface on the side of the other region of the wire guide groove; and
the inclination guide surface includes a first end and a second end, and the first end is directly connected to the body portion and the second end is directly connected to the fixation portion.

3. The wire type window regulator for vehicle according to claim 2, wherein the fixation portion extends in a direction crossing the inclination guide surface.

4. The wire type window regulator for vehicle according to claim 1, wherein the wire disconnection prevention portion and the inclination guide surface are positioned, in an extending direction of the wire guide groove, between both ends of the wired guide groove.

5. A wire type window regulator for vehicle comprising:
a guide rail fixed to a vehicle door panel;
a slider base supported to the guide rail to freely move up and down, a window glass being supported to the slider base;
a drive wire configured to drive to move up and down the slider base along the guide rail;
a wire driving mechanism configured to drive the drive wire;
a drive drum that has a wire guide groove around which the drive wire is wound on an outer peripheral surface; and
a drum housing that rotatably houses and supports the drive drum, wherein
the drum housing includes:
a wire routing guide groove of the drive drum that extends in a tangential direction of the wire guide groove;
a wire disconnection prevention portion disposed to extend from one region to another region of regions on both sides between which the wire routing guide groove is interposed, the wire disconnection prevention portion forming a wire insertion clearance from which the drive wire is introducible to the wire routing guide groove from the other region; and
an inclination guide surface disposed in the other region, the inclination guide surface guiding the drive wire to be introduced to the wire routing guide groove via the wire insertion clearance,
wherein the drum housing further includes an inclined rib which extends in a direction crossing an extending direction of the wire routing guide groove, and an edge of the inclined rib forms the inclination guide surface, wherein the drum housing further includes: a body portion having the wire routing guide groove, and a fixation portion which is positioned on an extension line of the inclined guide surface on the side of the other region of the wire routing guide groove, wherein the inclination guide surface includes a first end and a second end, and the first end directly connected to the body portion and the second end directly connected to the fixation portion.

6. The wire type window regulator for vehicle according to claim 5, wherein the fixation portion extends in a direction crossing the inclination guide surface.

7. The wire type window regulator for vehicle according to claim 5, wherein the wire disconnection prevention portion and the inclination guide surface are positioned, in an extending direction of the wire routing guide groove, between both ends of the wire routing guide groove.

* * * * *